United States Patent [19]
Rodermund et al.

[11] 3,852,868
[45] Dec. 10, 1974

[54] MACHINE FOR THE MANUFACTURE OF GARLANDS

[75] Inventors: Gerd Rodermund, Inderbreite 24;
Helmut Kappus, both of Lahr, Germany

[73] Assignee: said Rodermund, by said Kappus

[22] Filed: Nov. 7, 1973

[21] Appl. No.: 413,508

[30] Foreign Application Priority Data
Oct. 4, 1973  Germany...................... 7335892[U]

[52] U.S. Cl............................................... 29/208 D
[51] Int. Cl............................................ B23p 19/04
[58] Field of Search.......... 29/208 D, 208 R, 200 B, 29/200 R

[56] References Cited
UNITED STATES PATENTS
| | | | |
|---|---|---|---|
| 3,504,423 | 4/1970 | Kraszeski | 29/208 D |
| 3,665,577 | 5/1972 | Dieffenbach | 29/208 D |
| 3,693,233 | 9/1972 | Kent | 29/208 D |

*Primary Examiner*—Thomas H. Eager
*Attorney, Agent, or Firm*—Barnes, Kisselle, Raisch & Choate

[57] ABSTRACT

A machine for the manufacture of garlands incorporating a cutting device for spreading out a plastic sheet strip between a cutting roller and a cutting bar at both sides of the longitudinal center line of the strip, so that there remains a narrow uninterrupted web, with a pair of feed rollers for the spread-out strip together with twistable wires or threads introduced at both sides of the strip in parallel to the uninterrupted web, and with a cylindrical drum rotating around its vertical axis, into which the spread-out strip is direcred together with the twistable wires centrally from above through a twisting tube. The feed rollers are each provided with a central metallic section and two elastic end sections made of rubber. An adjustable braking device is associated with the twistable wires or threads in a way that the forwarding speed of the plastic sheet strips into the pair of feed rollers is between three and 30 times greater than that of the twistable wires or threads. The diameter of the drum is such so as to provide for a sufficient pull for pulling forward and twisting the garland.

7 Claims, 4 Drawing Figures

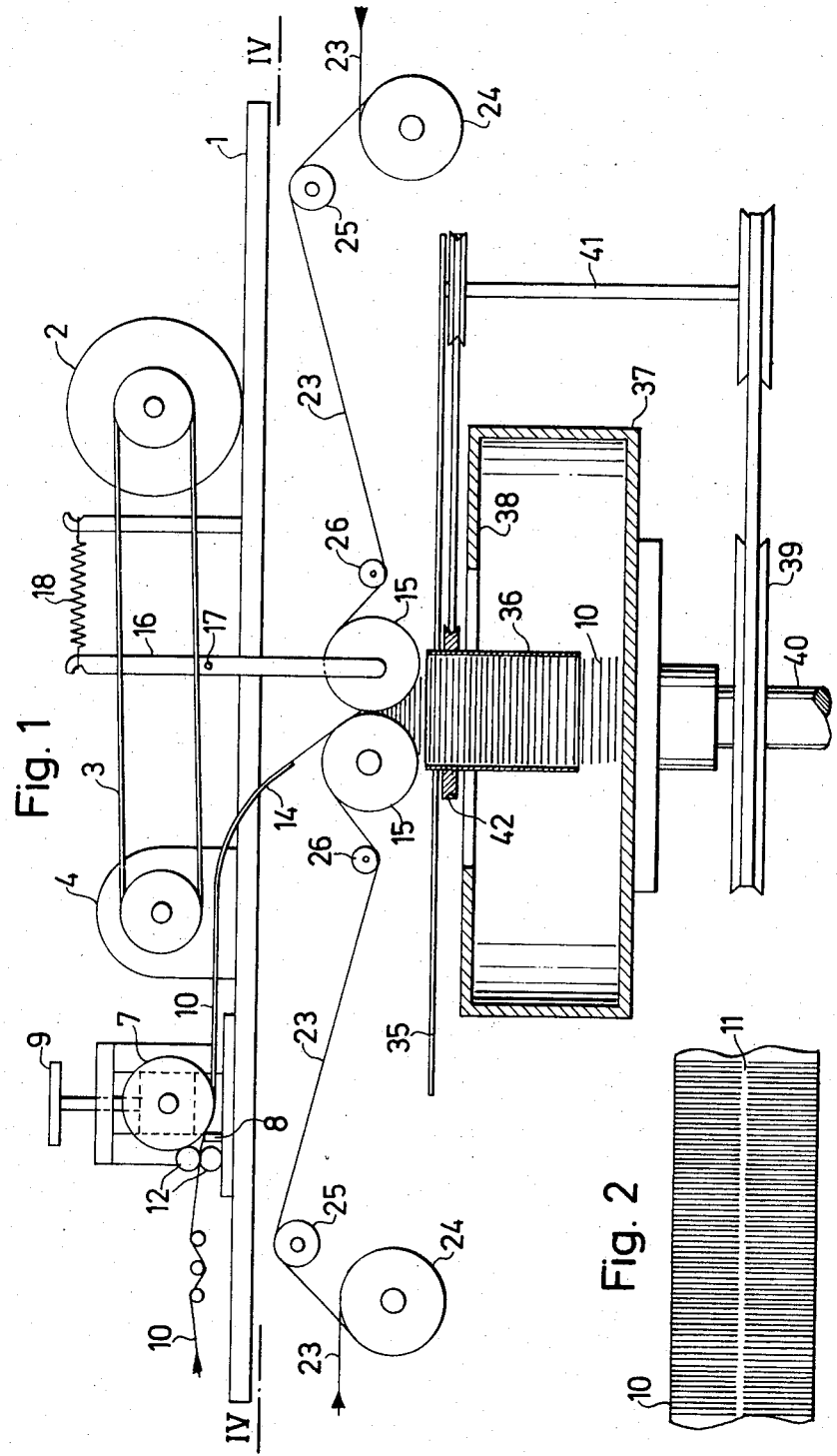
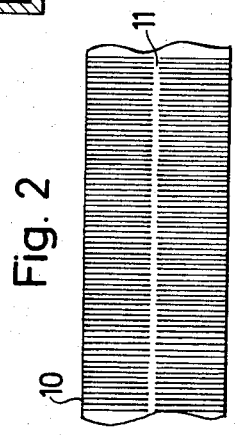

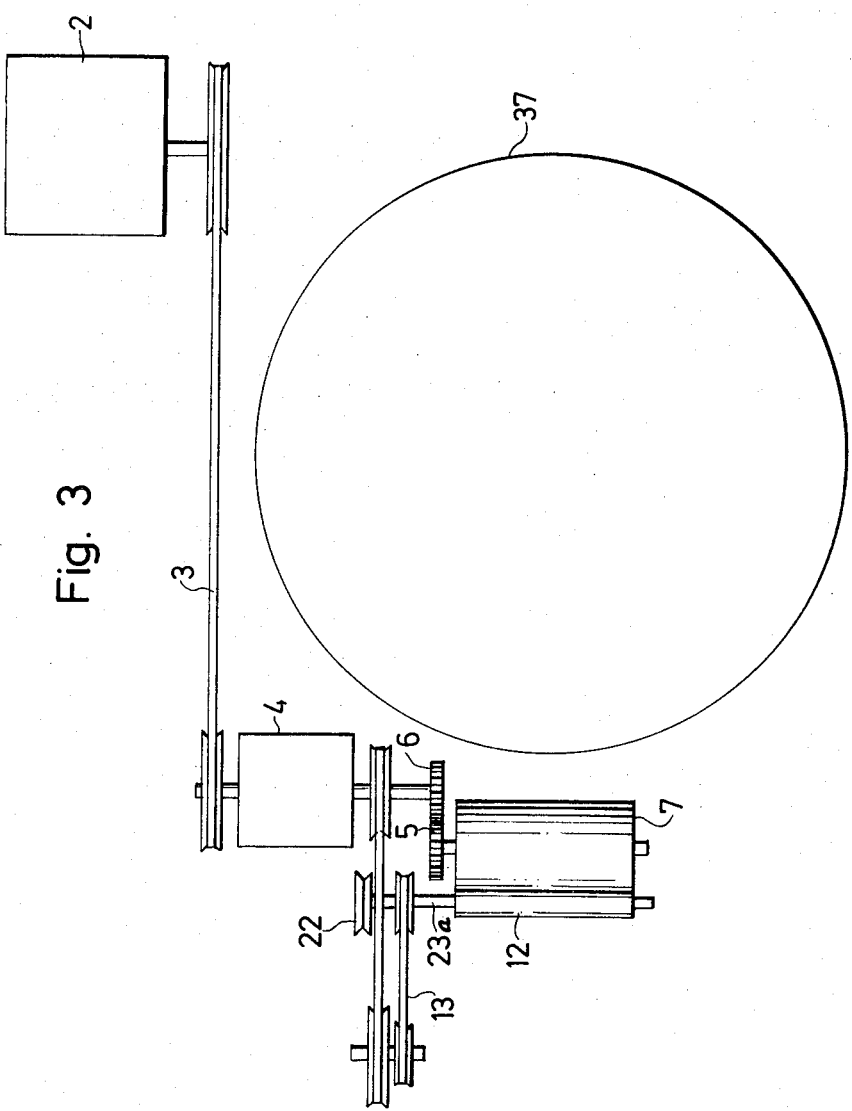

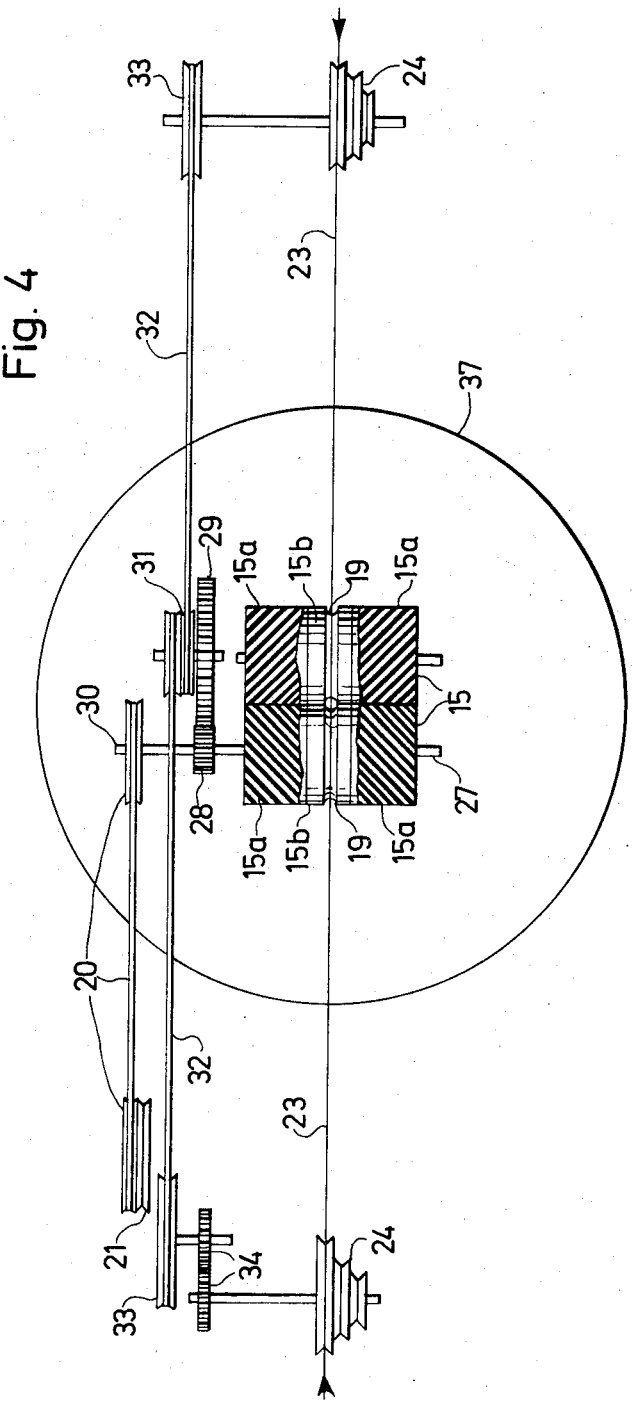

MACHINE FOR THE MANUFACTURE OF GARLANDS

The invention relates to a machine for the manufacture of garlands and includes a cutting device for spreading out (feathering out) a plastic sheet strip between a cutting roller and a cutting bar feather-like on each side of its longitudinal center line, so that there remains a narrow uninterrupted center web, with a pair of feed rollers for the feather-like plastic sheet strip and twistable wire or thread fed in on both sides of the strip and parallel to the uninterrupted center web, and with a cylindrical drum (pot) rotating around its vertical axis, into which the feather-like strip with the twistable wires is fed centrally from the top through a twisting tube.

Known machines of the kind described above have the disadvantage that only relatively thin, that is, poorly filled garlands can be manufactured as only a restricted number of needles per unit length can be formed when spreading out the strip. It is possible to manufacture substantially fuller garlands, for example by the feather-like spreading out of three strips and directing them together into the pair of feed rollers. However, in that case a plurality of cutting devices are required, as only one strip can be produced per cutting device, if the uninterrupted center web for achieving needles projecting straight from the axis of the garland is to be very narrow (less than 1 mm). In addition, the cutting devices must operate exactly synchronously, because the spread-out plastic sheet strips withstand only very moderate tension on account of the uninterrupted narrow web. More than three separately spread-out strips cannot be combined simultaneously in practice.

Since in the interest of a better esthetic effect there is a demand for garlands which are even more full, the attempt was made to subsequently twist in a known way two garlands of the aforesaid type each incorporating three separate spread-out plastic sheet strips. The expenditure for said garlands is, however, considerable, as two machines will be needed of which each is provided with three cutting devices, as well as an additional machine for twisting the finished garlands. Besides, the operating speed is low. The esthetic impression of said garlands and their handling is impaired by the relatively thick garland core which consists of at least four twisting wires and needles trapped by the wires.

It is, therefore, the principal object of this invention to provide a machine for producing very full garlands, which incorporates only one cutting device, in only one operation and with high production results. This object of the invention is attained by starting from a machine of the aforesaid type characterized in that the feed rollers each have a metallic center section provided with a guide groove for the twistable wires or threads, and two outer elastic sections made of rubber, that an adjustable braking device is associated with each of the twistable wires or threads in a way to provide for a forwarding speed of the plastic sheet strip into the pair of feed rollers which is three to 30 times higher than the forwarding speed of the twistable wires or threads, and that the drum diameter is selected as to provide a sufficient tension for pulling forward and twisting the garland.

The center section of the feed rollers is made of metal and preferably of steel; by means of this section and the guide grooves it is possible to forward the braked twistable wires at a substantially lower speed. By contrast, the weak spread-out plastic sheet strip is forwarded at high speed into the feed rollers and entwined between the twistable wires or threads. This results in a very full and dense garland, as a strip which is many times longer is combined per unit length with the twistable wires. Preferably, the forwarding speed of the plastic sheet strip is six to 12 times greater than that of the twistable wires, although the speed relation may also be between three and 30.

In order to achieve the necessary pull, the diameter of the drum receiving the garland must be relatively large compared with known machines. If a garland is to have a predetermined length of lay of the twistable wires, the drum must consequently have a predetermined revolutionary speed at a predetermined speed of pull. An increase of the pull is, therefore, only possible by increasing the diameter of the drum. A greater drum diameter has the advantage that the drum can receive a substantially larger quantity of the garland, that is, that the length of the the garlands must be restricted to a few meters.

Another object of the invention is to provide a braking device incorporating a braking roller wrapped by the twistable wire or thread, the speed of revolution of the braking roller being adjustable by means of a drive comprising a brake. This means that the braking force can be adjusted easily, and that in particular the forwarding speed of the twistable wires is warranted to remain constant even after prolonged operation. It is particularly effective if in accordance with an additional object of the invention the cutting roller, the feed rollers, and the braking rollers are driven by a common electric motor with adjustable speed. In that way, the speed once chosen and adjusted will remain constant even if the absolute speed changes.

To adjust the needle width resulting from spreading out the plastic sheet strip, the speed relation of the cutting roller and a pair of forwarding rollers mounted in cooperative relationship with the cutting roller can be changed in accordance with the invention by means of a continuously adjustable gear unit. In that way, garlands of appearance can be formed.

The material considered for the strip in particular includes plastic sheet material, for example made of hardened polyvinyl chloride or polyethylene, which may be metallized on one or both sides or, in addition, colored.

Since the spread-out strips are easily torn on account of the remaining very narrow web, it is another object of the invention to provide for the speed relation of the pair of forwarding rollers and the pair of feed rollers to be finely adjustable by means of a continuously adjustable transmission for adjusting the tension of the plastic sheet strip.

The cylindrical drum is best driven by a separate electric motor via a transmission having a variable transmission ratio, with a braking device being provided for rapidly stopping the drum. This is necessary, because the drum rotating at high speed stores a high rotational energy in particular when filled, so that without braking coming to rest would take a considerable time.

For a better understanding of the invention as well as other objects and features thereof, reference is had to the following detailed description of the invention to be read in connection with the accompanying drawings, wherein:

FIG. 1 is a diagrammatic side view of a machine according to the invention;

FIG. 2 is a spread-out plastic sheet strip;

FIG. 3 is a diagrammatic top view of the machine according to FIG. 1;

FIG. 4 is a diagrammatic sectional top view of the machine according to FIG. 1 taken along line IV—IV of FIG. 1.

Referring now to the drawings, there is shown a machine for the manufacture of garlands as an embodiment of the invention with a rigid base frame schematically shown as a base plate 1. Supported by the base plate is shown an electric motor 2 incorporating speed adjustment which on account of the considerable adjustment range should be a d.c. motor with electronic control. Motor 2 drives a reduction gear unit 4 by means of a belt drive. As shown schematically in FIG. 3, the gear unit 4 drives the cutting roller 7 through two gears 5,6. Aforesaid cutting roller is provided in known manner with axial cutting edges uniformly arranged on its surface, which cooperate with a cutting bar 8. By means of height adjustment 9 of cutting rollers 7, schematically shown in FIG. 1, and fine adjustment means (not shown) of cutting bar 8, a plastic sheet strip 10 introduced between cutting bar 8 and cutting roller 7 is spread out (feathered out). A groove in cutting roller 7 and a small notch in cutting bar 8 provide for the cuts in plastic sheet strip 10 to be made only on both sides of the longitudinal center line in accordance with the representation in FIG. 2. Thus, in the center of the strip there remains a narrow ininterrupted web 11 which, for example, may have a width of 0.7 mm.

From a source (not shown) the plastic sheet strip 10 is forwarded by means of a pair of forwarding rollers 12. The pair of forwarding rollers 12 is driven by gear unit 4 through belt transmission 13 incorporating a finely adjustable transmission ratio.

The spread-out plastic sheet strip 10 is directed through a guide 14 between the feed rollers 15. One of the feed rollers 15 is mounted on a swing 16 pivotable around point 17, so that feed rollers 15 are yieldingly biased against each other with a selectable force by means of tensioning spring 18.

As shown in more detail in FIG. 4, feed rollers 15 each have a cylindrical center section 15b made of steel and provided with a circumferential groove 19. At both sides of center section 15b there are provided cylindrical sections 15a of the same diameter made of rubber. One of the two feed rollers 15 (the left-hand side roller in the drawing) is driven through a belt transmission 20 incorporating an adjustable transmission ratio. On the drive side of the belt transmission 20 there is provided a pulley 21 mounted in cooperative relationship with a corresponding pulley 22 (FIG. 3) on shaft 23a of one of the forwarding rollers 12 by means of a belt not shown. By means of belt transmission 20, therefore, the forwarding difference between the forwarding rollers 12 and the feed rollers 15 and, thus, the desired tension of the plastic sheet strip 10 can be adjusted.

Twistable wires 23 are directed from a source not shown via brake rollers or rolls wrapped once or several times over idler rollers 25, 26 to grooves 19 of feed rollers 15. To brake the twistable wires 23, the wrapped brake rollers 24 are driven at a predetermined speed or braked down to such a speed. For this purpose, a gear 28 is fixedly mounted on shaft 27 of left-hand side feed roller 15, the gear being in meshing relationship with a larger gear 19 on an intermediate shaft 30 and providing a transmission ratio of one to six. Brake rollers 24 are braked by means of the intermediate shaft 30 via two pulleys 31, belts 32 and pulleys 33, with a pair of gears 34 provided for a reversal of the direction of rotation of the left-hand side brake roller 24.

Below the pair of feed rollers 15 there is rotatably mounted on a plate 35 fixed to the machine base a cylindrical piece of tubing 36 into which is fed the spread-out plastic sheet 10. Tubing 36 ends in a cylindrical drum (pot) 37 having a cylindrical half-cover 38. Drum 37 is rotatably mounted on its bottom in the machine base in a way not shown in detail, and is driven, also in a way not shown, by an electric motor incorporating a speed adjustment. A pulley 39 on shaft 40 of drum 37 drives tubing 36 via an intermediate shaft 41 and pulley 42 in the same direction of rotation and with approximately the same speed as drum 37.

During operation, the garland formed by twisting the twistable wires 23 around the spread-out plastic sheet strip 10 is pressed against the inner wall of the drum 37 by means of the centrifugal force. In relation with the speed of rotation of drum 37 of up to some 100 RPM and in relation with the diameter of drum 37 of more than 1 m, twistable wires 23 are pulled forward at considerable tension. Brake rollers 24 provide for the speed of the twistable wires 23 to be substantially lower than that of the plastic sheet strip 10. In that way, a very dense and full garland is formed. The relation between the pulling speed of the twistable wires 23 and the pulling speed of plastic sheet strip 10 can be chosen up to a ratio of 1 to 30. Preferably, the machine is operated at a ratio of from 1 to 6 and 1 to 20. By means of the steps of brake rollers 24 a change is easily possible also during operation. It will of course also be possible to include a transmission with a finely adjustable transmission ratio.

We claim:

1. A machine for the manufacture of garlands incorporating a cutting device for spreading out a plastic sheet strip between a cutting roller and a cutting bar at both sides of the longitudinal center line of the strip, so that there remains a narrow uninterrupted web, with a pair of feed rollers for the spread-out strip together with twistable wires or threads introduced at both sides of the strip in parallel to the uninterrupted web, and with a cylindrical drum rotating around its vertical axis, into which the spread-out strip is directed together with the twistable wires centrally from above through a twisting tube, characterized in that the feed rollers are each provided with a central metallic section and two elastic end sections made of rubber, an adjustable braking device is associated with the twistable wires or threads in a way that the forwarding speed of the plastic sheet strips into the pair of feed rollers is between three and 30 times greater than that of the twistable wires or threads, and that the diameter of the drum is such as to provide for a sufficient pull for pulling forward and twisting the garland.

2. A machine according to claim 1, characterized in that the braking device comprises a braking roller around which the twistable wire or thread is wrapped, the speed of rotation of the brake roller being adjustable by a drive capable of braking.

3. A machine according to claim 2 characterized in that a continuously adjustable transmission is provided for adjusting the speed ratio of the cutting roller and of the pair of forwarding rollers associated with the cutting roller for adjusting the width of the needles formed by spreading out the plastic sheet strip.

4. A machine according to claim 2 characterized in that the cutting roller, the feed rollers, and the braking rollers are driven by a common electric motor at an adjustable speed through a transmission.

5. A machine according to claim 4 characterized in that a continuously adjustable transmission is provided for adjusting the speed ratio of the cutting roller and of the pair of forwarding rollers associated with the cutting roller for adjusting the width of the needles formed by spreading out the plastic sheet strip.

6. A machine according to claim 1 characterized in that the cutting roller, the feed rollers, and the braking rollers are driven by a common electric motor at an adjustable speed through a transmission.

7. A machine according to claim 1, characterized in that the cylindrical drum is driven by an electric motor through a transmission having an adjustable transmission ratio, and that a braking device is provided for rapidly stopping the drum.

* * * * *